US012747678B2

(12) United States Patent
Wilson

(10) Patent No.: US 12,747,678 B2
(45) Date of Patent: Sep. 29, 2026

(54) GASKET FOR TURBINE ENGINE AND TURBINE MOUNT ASSEMBLY

(71) Applicant: Aerofield Services LLC, Aurora, CO (US)

(72) Inventor: Phil Wilson, Hudson, CO (US)

( * ) Notice: Subject to any disclaimer, the term of this patent is extended or adjusted under 35 U.S.C. 154(b) by 7 days.

(21) Appl. No.: 18/587,642

(22) Filed: Feb. 26, 2024

(65) Prior Publication Data

US 2024/0295179 A1 Sep. 5, 2024

Related U.S. Application Data

(60) Provisional application No. 63/449,223, filed on Mar. 1, 2023.

(51) Int. Cl.
*F01D 25/28* (2006.01)
*F16J 15/08* (2006.01)

(52) U.S. Cl.
CPC .......... *F01D 25/28* (2013.01); *F16J 15/0818* (2013.01)

(58) Field of Classification Search
CPC ...... F02C 7/32; F02C 7/36; F02C 7/20; F01D 25/28; F01D 25/285; F05D 2230/60; F05D 2230/72; F16J 15/0818
See application file for complete search history.

(56) References Cited

U.S. PATENT DOCUMENTS

| | | | | |
|---|---|---|---|---|
| D315,491 | S | 3/1991 | Skowron | |
| D372,074 | S | 7/1996 | Wallace | |
| D375,150 | S | 10/1996 | Wainer | |
| D644,720 | S | 9/2011 | Bond | |
| D644,721 | S | 9/2011 | Bond | |
| D749,708 | S | 2/2016 | Smith | |
| D857,491 | S | 8/2019 | Bell | |
| D886,253 | S | 6/2020 | Brown | |
| D917,025 | S | 4/2021 | Brown | |
| D930,126 | S | 9/2021 | Kumar | |
| 2018/0058474 | A1* | 3/2018 | Strait | F01D 25/145 |
| 2018/0058568 | A1* | 3/2018 | Martin | F16H 57/025 |
| 2019/0368636 | A1* | 12/2019 | Scannell | F16L 3/202 |
| 2020/0056733 | A1* | 2/2020 | Trombatore | F16L 41/14 |
| 2021/0131559 | A1* | 5/2021 | Gross | F16J 15/061 |
| 2021/0262348 | A1 | 8/2021 | Willett, Jr. | |

OTHER PUBLICATIONS

"CFM56-5B Engine Shop Manual," CFM, 2021, 71-00-01 Assembly 018, p. 1005, 1 page.

* cited by examiner

*Primary Examiner* — Nathaniel E Wiehe
*Assistant Examiner* — Maxime M Adjagbe
(74) *Attorney, Agent, or Firm* — Sheridan Ross PC

(57) ABSTRACT

A gasket comprising at least one spacer and configured to prevent contact between a mount link of a turbine mount assembly and a turbine frame mount of an aircraft engine, which is a turbine engine in some embodiments, is provided. The at least one spacer includes a pin cutout to receive a turbine frame pawl pin of the engine mount and a pin groove that is expandable so as to enable the turbine frame pawl pin to pass through and into the pin cutout. The gasket may include a grommet for receiving a connecting ring that is coupled to a streamer grommet of a streamer. The streamer may act as an identifier for the gasket.

20 Claims, 18 Drawing Sheets

GASKET FOR TURBINE ENGINE AND TURBINE MOUNT ASSEMBLY

CROSS REFERENCE TO RELATED APPLICATIONS

This application is a claims the benefit of U.S. Provisional Application No. 63/449,223, filed on Mar. 1, 2023, which application is incorporated herein by reference in its entirety.

FIELD

The present technology is generally related to gaskets and in particular, gaskets for an engine or more particularly, a turbine engine, to prevent contact between a turbine mount assembly and a turbine frame mount.

BACKGROUND

Aircraft engines or aircraft turbine engines (hereinafter "turbine" or "turbines") may be periodically removed from an aircraft, typically a wing if a mount assembly is used, for routine maintenance or repair. The turbine may be connected to and removed from the aircraft via a turbine mount assembly attached to the turbine. The turbine mount assembly typically comprises a mount (which is removably connected to the aircraft wing), a mount link connected on one end to the mount, and a turbine frame mount permanently connected to an outer housing of the turbine, where the mount link is connected on a second end to the turbine frame mount. When the turbine and turbine mount assembly (which are connected to each other) are removed from the aircraft and the turbine mount assembly is in a non-suspended position, i.e., not suspended on an aircraft wing, the mount link of the turbine mount assembly may have undesirable contact with the turbine frame mount on the turbine housing. Such contact may result in damage and/or dents to the turbine frame mount and/or the mount link. Conventional devices and/or methods to prevent such contact include placing wooden shims between the turbine frame mount and the mount link. However, the wooden shims may fall out of place between the turbine frame mount and the mount link and/or may be forgotten such that they may not be removed before installing the turbine and mount back onto the aircraft.

SUMMARY

The devices of this disclosure generally relate to providing a gasket for a turbine and a turbine mount assembly that is removably securable to the turbine mount assembly, is easy to use, is reusable, and is easily identifiable. Methods of the present disclosure generally relate to preventing components of the turbine mount assembly from contacting each other in undesirable ways and/or damaging each other during contact, and specifically preventing the mount link of the turbine mount assembly from having undesirable and/or damaging contact with the turbine frame mount on the turbine housing.

In one aspect, the present disclosure provides a gasket according to at least one embodiment of the present disclosure, the gasket comprising a first spacer having a first pin cutout and a first pin groove connected to the first pin cutout; a second spacer having a second pin cutout and a second pin groove connected to the second pin cutout; and a connector coupling the first spacer to the second spacer. The first pin groove and the second pin groove may each be expandable to enable a turbine frame pawl pin to pass through and into each of the first pin groove and the second pin groove, respectively. The first spacer and the second spacer may each be positioned between a mount link of a turbine mount assembly and a turbine frame mount of a turbine to prevent contact between the mount link and the turbine frame mount.

Each of the first spacer and the second spacer may have a circular shape with a flat portion adjacent to opposite sides of the first pin groove and the second pin groove, respectively.

The first spacer and the second spacer may each be formed from an elastic, flexible material. The elastic, flexible material may comprise at least one of rubber, silicone, polysiloxane, thermoplastic olefin, thermoplastic polyolefin, or thermoplastic elastomer.

A thickness of the first spacer may be different than a thickness of the second spacer.

The first pin cutout and the second pin cutout may each comprise a circular aperture. A first distance between the first pin groove may be less than a diameter of the first pin cutout and a second distance between the second pin groove may be less than a diameter of the second pin cutout.

The gasket may further include a connecting ring and a streamer connected to the connector by the connecting ring. The connector may comprise a grommet configured to receive the connecting ring and the streamer may comprise a streamer grommet configured to receive the connecting ring.

The first spacer and the second spacer may each have a thickness between about ⅛" to about ½".

The gasket may be movable between a first position and a second position. The gasket may be in the second position when positioned between the mount link of the turbine mount assembly and the turbine frame mount of the turbine. The gasket may be flat when in the first position and bent at the connector when in the second position.

A system according to at least one embodiment of the present disclosure comprises a first spacer comprising: a first pin cutout comprising a first circular aperture, and a first pin groove connected to the first pin cutout, the first spacer having a circular shape with a flat portion adjacent to opposite sides of the first pin groove, the first pin groove having a first distance that is less than a first diameter of the first pin cutout; and a second spacer comprising: a second pin cutout comprising a second circular aperture, and a second pin groove connected to the second pin cutout, the second spacer having a circular shape with a flat portion adjacent to opposite sides of the second pin groove, the second pin groove having a second distance that is less than a second diameter of the second pin cutout, wherein the first spacer is positioned between a first side of a mount link of a turbine mount assembly and a turbine frame mount of a turbine and the second space is positioned between a second side of the mount link and the turbine frame mount.

The system may further include a first connecting ring; a first streamer connected to the first spacer by the first connecting ring; a second connecting ring; and a second streamer connected to the second spacer by the second connecting ring.

The first spacer may comprise a first grommet configured to receive the first connecting ring and the first streamer comprises a first streamer grommet configured to receive the first connecting ring. The second spacer may comprise a second grommet configured to receive the second connecting ring and the second streamer comprises a second streamer grommet configured to receive the second connecting ring.

In another aspect, the present disclosure provides a method for installing a gasket onto a turbine according to at least one embodiment of the present disclosure, the method comprising: removing a turbine from an aircraft via a turbine mount assembly, the turbine having a turbine frame mount extending from a turbine frame and the turbine mount assembly having a mount link coupled to the turbine frame mount via a turbine frame pawl pin; installing a first spacer onto the turbine frame pawl pin and between the mount link and a first flange of the turbine frame mount, wherein the first spacer includes a first pin cutout to receive the turbine frame pawl pin and a first pin groove connected to the first pin cutout that is configured to expand to enable the turbine frame pawl pin to pass through the first pin groove and into the first pin cutout; and installing a second spacer onto the turbine frame pawl pin and between the mount link and a second flange of the turbine frame mount, wherein the second spacer includes a second pin cutout to receive the turbine frame pawl pin and a second pin groove connected to the second pin cutout that is configured to expand to enable the turbine frame pawl pin to pass through the second pin groove and into the second pin cutout.

The first spacer and the second spacer may be connected via a connector. Each of the first spacer and the second spacer may have a circular shape with a flat portion adjacent to opposite sides of the first pin groove and the second pin groove, respectively. The first spacer and the second spacer may each be formed from an elastic, flexible material. The elastic, flexible material may comprise at least one of rubber, silicone, polysiloxane, thermoplastic olefin, thermoplastic polyolefin, or thermoplastic elastomer.

The details of one or more aspects of the disclosure are set forth in the accompanying drawings and the description below. Other features, objects, and advantages of the techniques described in this disclosure will be apparent from the description and drawings, and from the claims.

The phrases “at least one”, “one or more”, and “and/or” are open-ended expressions that are both conjunctive and disjunctive in operation. For example, each of the expressions “at least one of A, B and C”, “at least one of A, B, or C”, “one or more of A, B, and C”, “one or more of A, B, or C” and “A, B, and/or C” means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term “a” or “an” entity refers to one or more of that entity. As such, the terms “a” (or “an”), “one or more” and “at least one” can be used interchangeably herein. It is also to be noted that the terms “comprising”, “including”, and “having” can be used interchangeably.

The preceding is a simplified summary of the disclosure to provide an understanding of some aspects of the disclosure. This summary is neither an extensive nor exhaustive overview of the disclosure and its various aspects, embodiments, and positions. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and positions of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and positions of the disclosure, as illustrated by the drawings referenced below.

DETAILED DESCRIPTION

Figure 1:
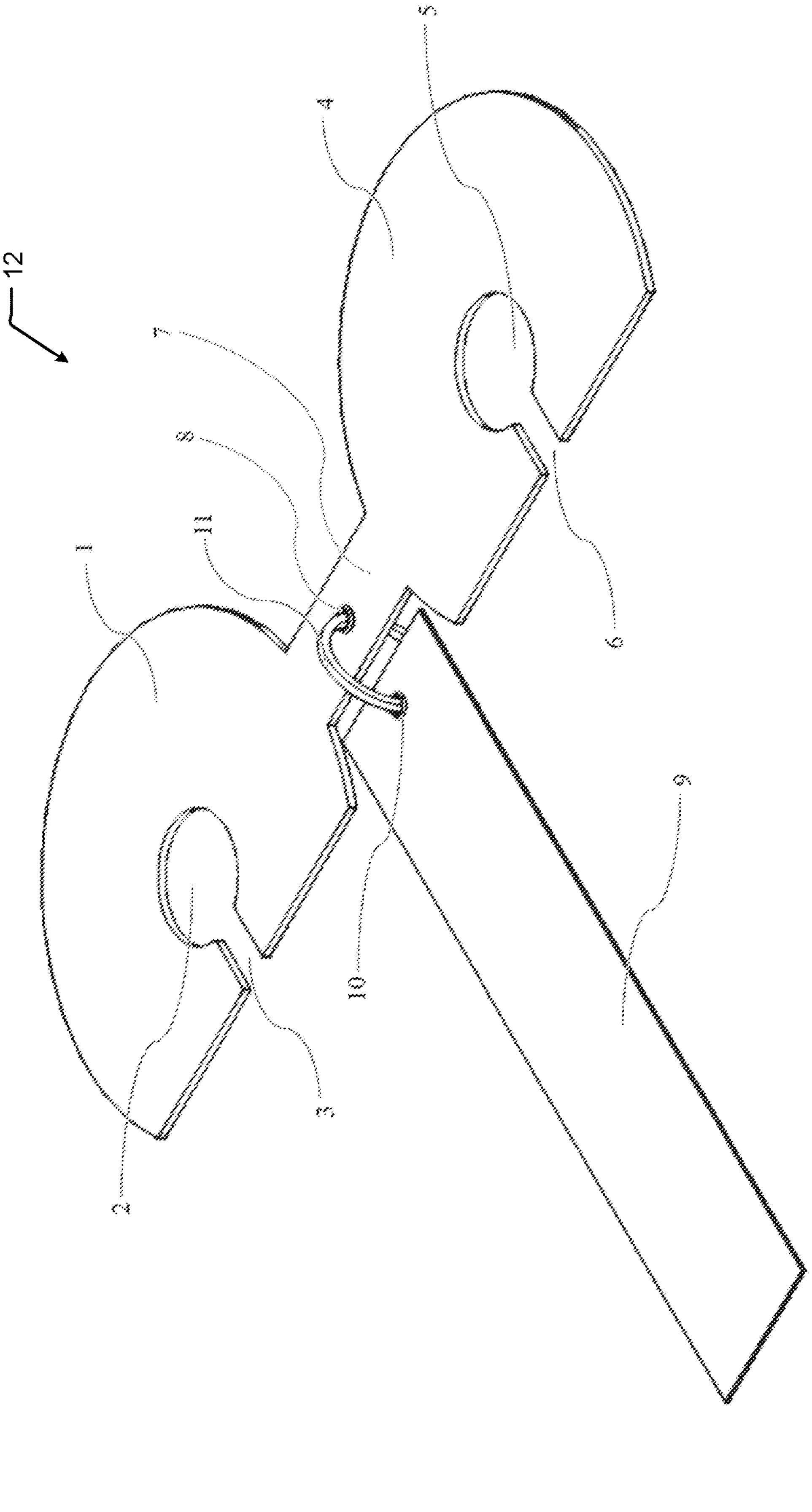
FIG. 1 is a bottom left perspective view of a gasket in a first position, a connecting ring, and a streamer according to at least one embodiment of the present disclosure.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single component for purposes of clarity, it should be understood that the techniques of this disclosure may be performed by a combination of component associated with, for example, a turbine engine.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The use of "substantially" in the present disclosure, when referring to a measurable quantity (e.g., a diameter or other distance) and used for purposes of comparison, is intended to mean within 5% of the comparative quantity. The terms "substantially similar to," "substantially the same as," and "substantially equal to," as used herein, should be interpreted as if explicitly reciting and encompassing the special case in which the items of comparison are "similar to," "the same as" and "equal to," respectively.

As previously described, an engine or a turbine 18 (partially shown in FIGS. 11-16) may be periodically removed from an aircraft for routine maintenance or repair via a turbine mount assembly 19 attached to the turbine 18. The turbine mount assembly 19 remains attached to the turbine 18 such that it is the turbine mount assembly 19 that is attached to and removed from the aircraft and typically, for example, from the wing of the aircraft. When the turbine 18 and turbine mount assembly 19 are removed from the aircraft and the turbine mount assembly 19 is in a non-suspended position, a mount link 13 of the turbine mount assembly 19 may contact a turbine frame mount 17 of the turbine 18. Such contact may result in damage or dents to the mount link 13 as the mount link 13 is typically manufactured from a softer material than the turbine frame mount 17. Thus, it is desirable to prevent contact between the mount link 13 and the turbine frame mount 17 using, for example, a turbine mount gasket 12 (hereinafter a "gasket") as described in detail below.

Figure 2:
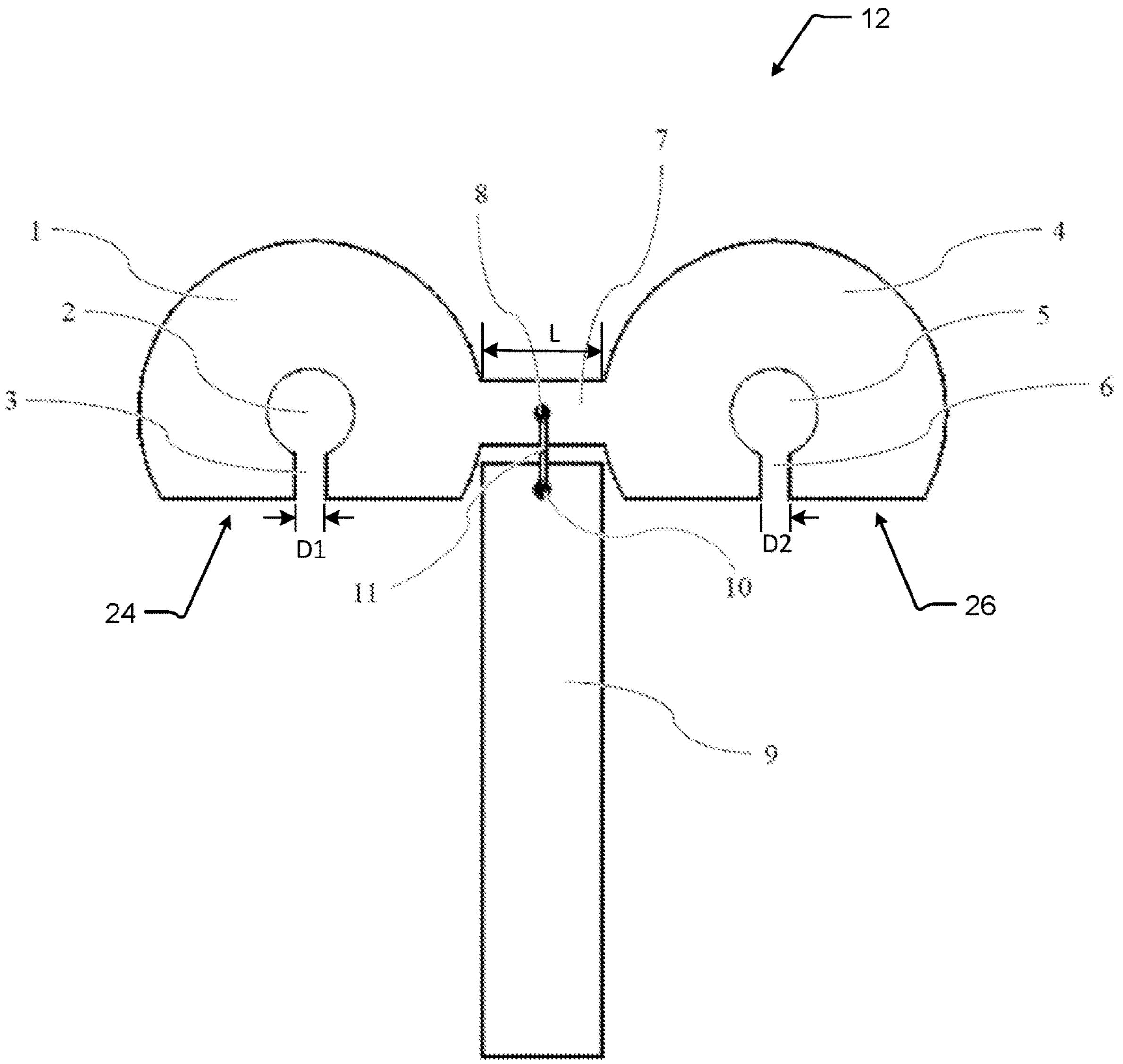
FIG. 2 is a left side view of the gasket in the first position, the connecting ring, and the streamer of FIG. 1 according to at least one embodiment of the present disclosure.
Figure 3:
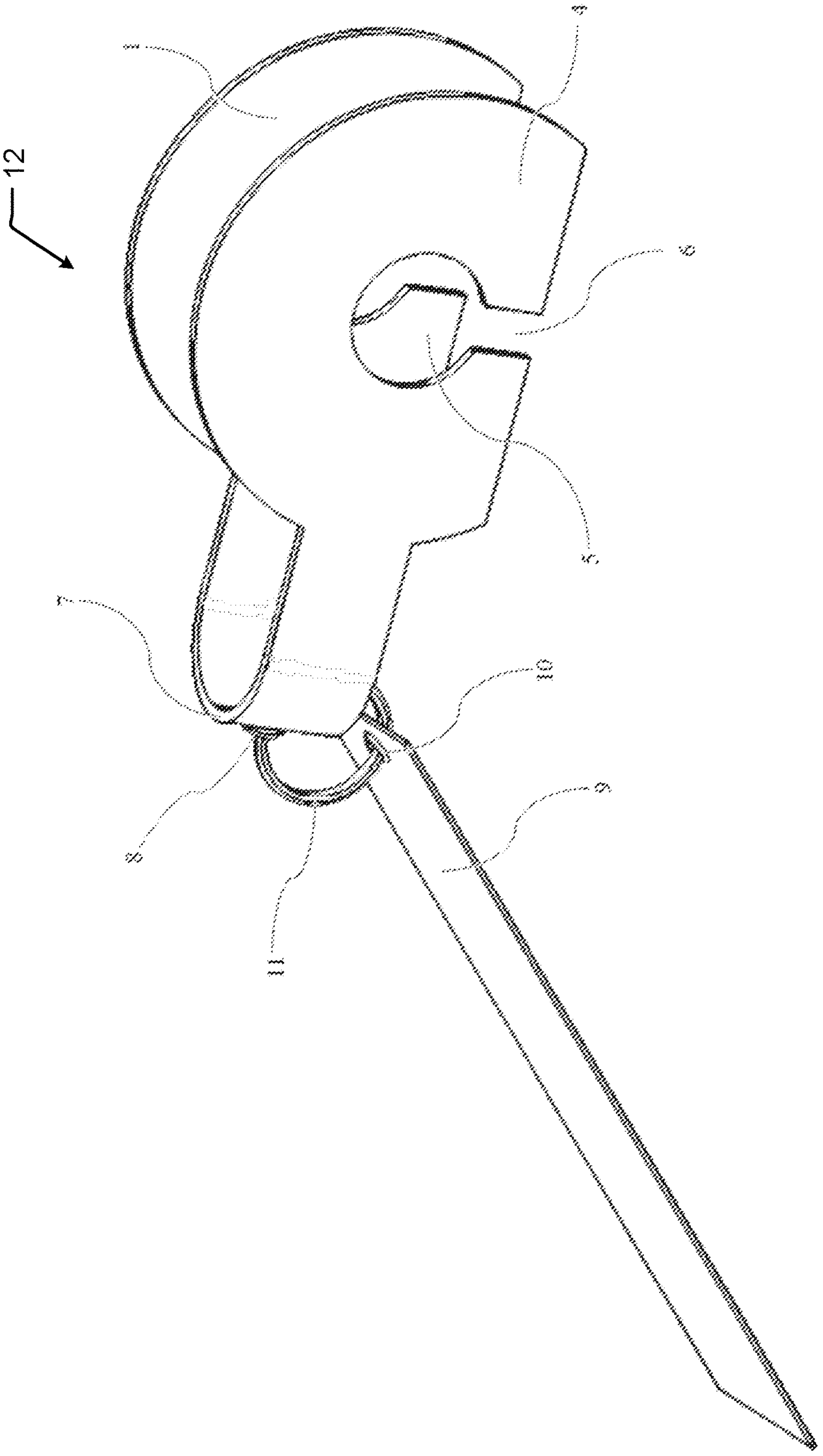
FIG. 3 is a side perspective view of the gasket in a second position, the connecting ring, and the streamer of FIG. 1 according to at least one embodiment of the present disclosure.
Figure 4:
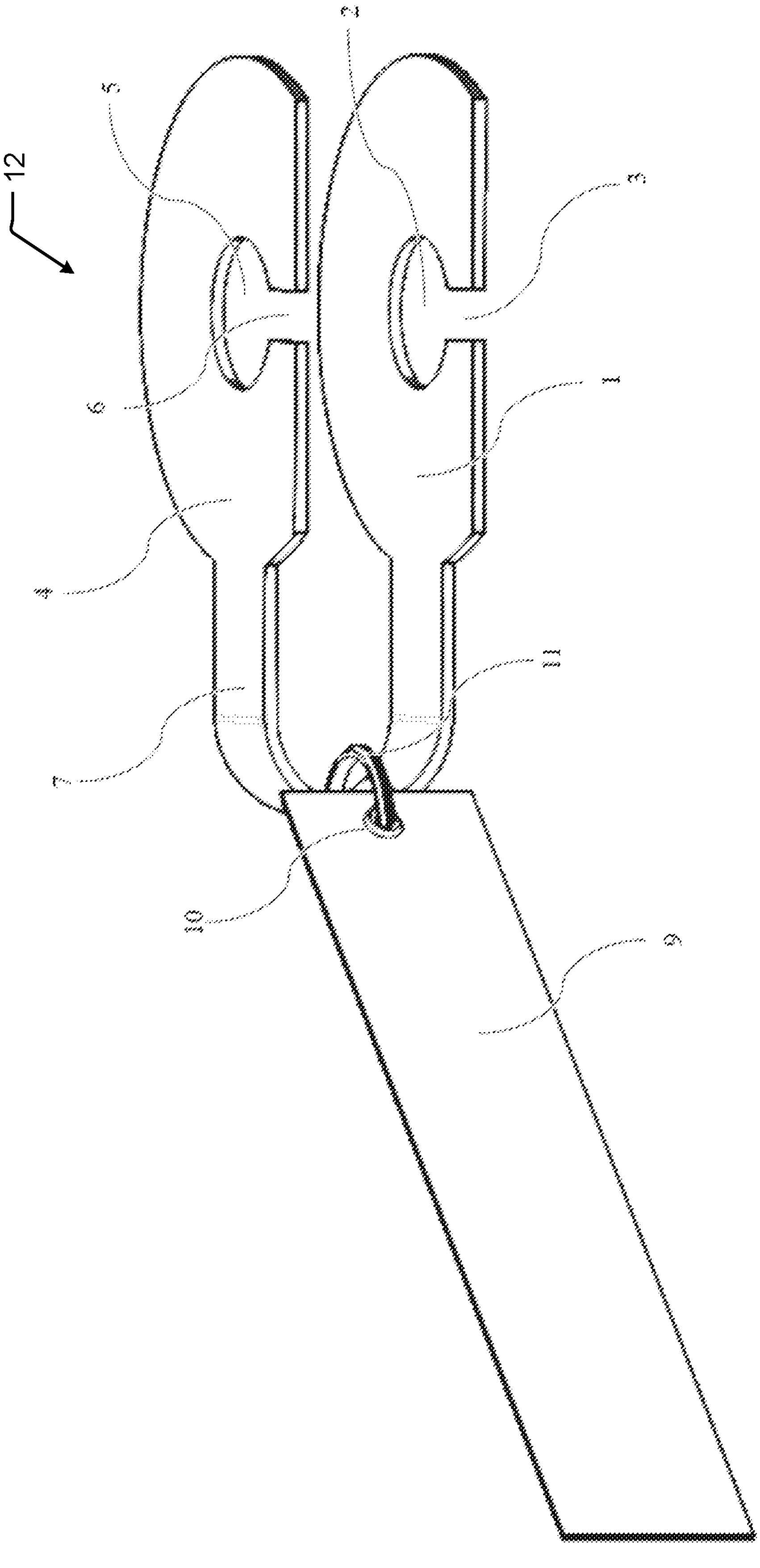
FIG. 4 is a bottom perspective view of the gasket in the second position, the connecting ring, and the streamer of FIG. 1 according to at least one embodiment of the present disclosure.
Figure 5:
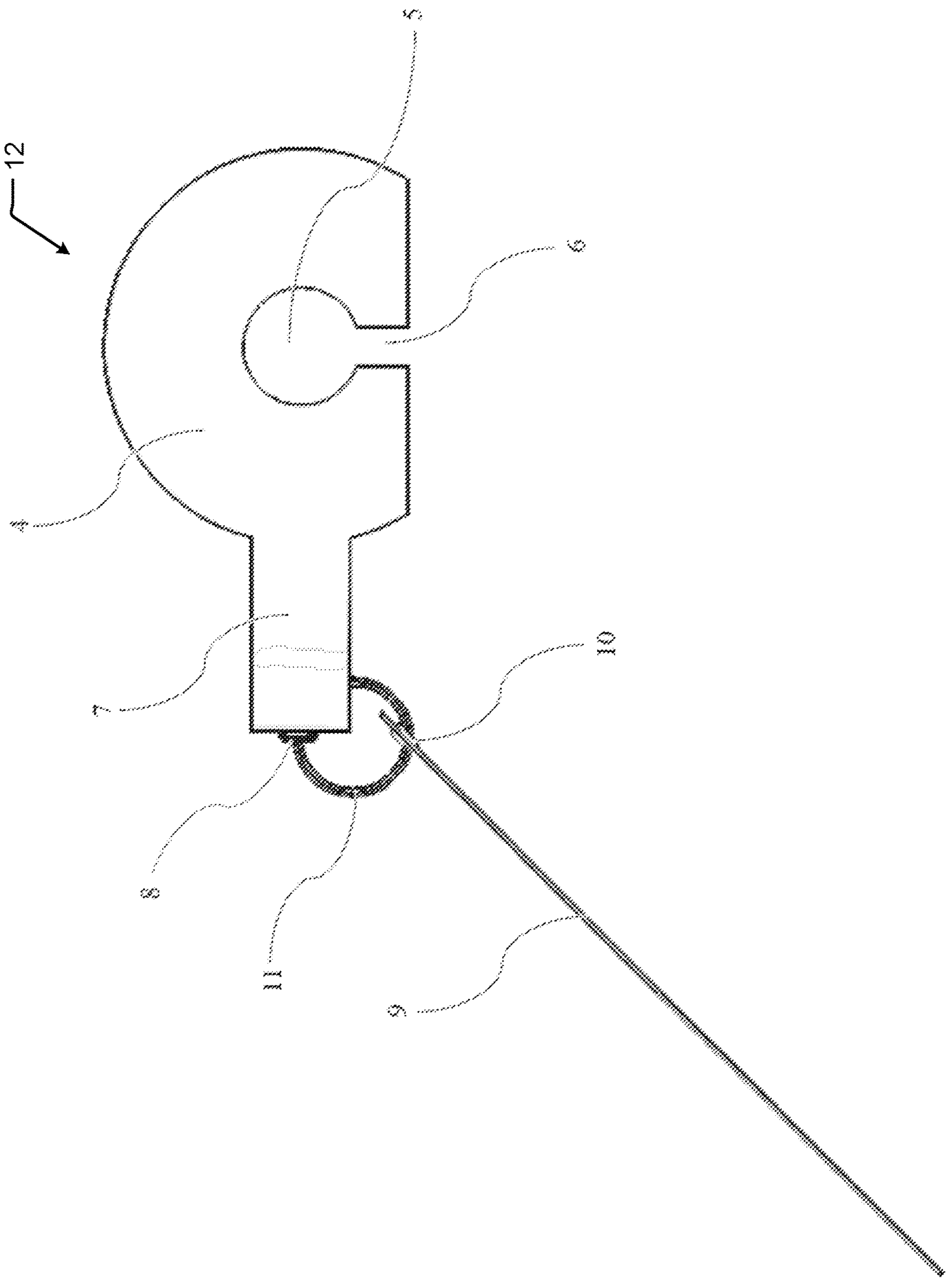
FIG. 5 is a left side view of the gasket in the second position, the connecting ring, and the streamer of FIG. 1 according to at least one embodiment of the present disclosure.
Figure 6:
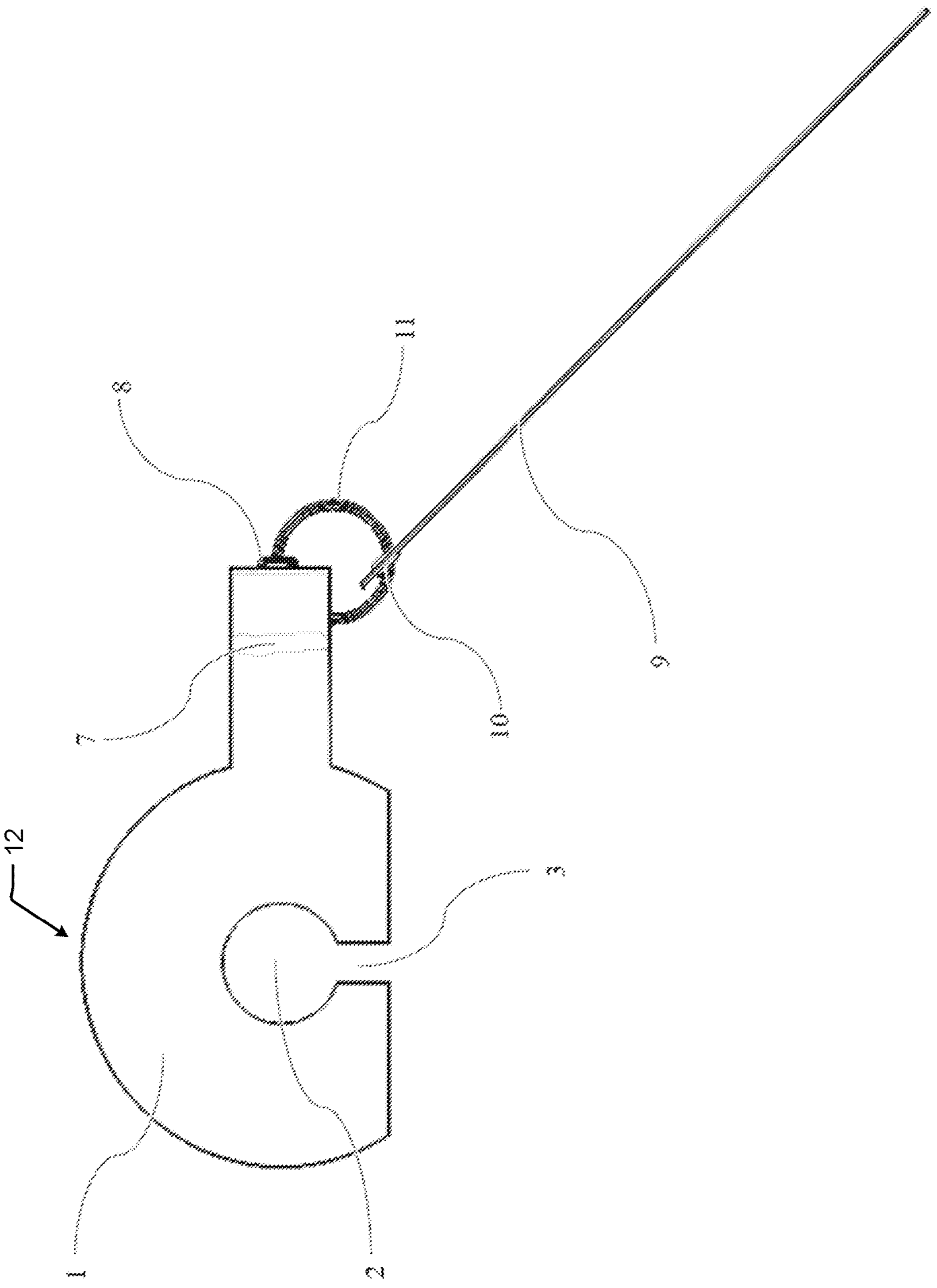
FIG. 6 is a right side view of the gasket in the second position, the connecting ring, and the streamer of FIG. 1 according to at least one embodiment of the present disclosure.
Figure 7:
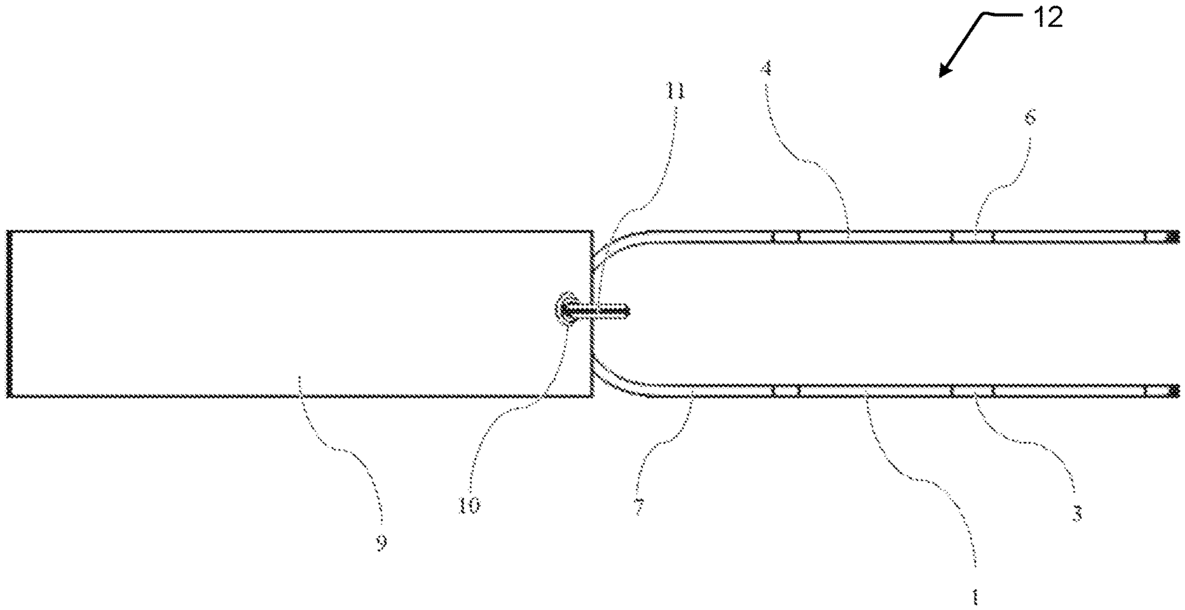
FIG. 7 is a bottom view of the gasket in the second position, the connecting ring, and the streamer of FIG. 1 according to at least one embodiment of the present disclosure.
Figure 8:
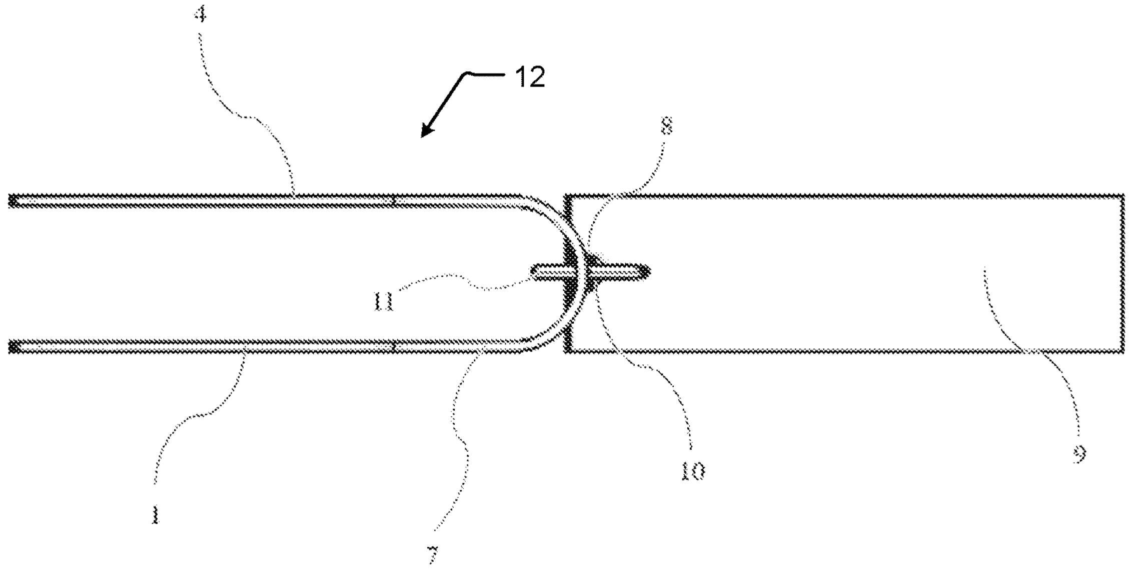
FIG. 8 is a top view of the gasket in the second position, the connecting ring, and the streamer of FIG. 1 according to at least one embodiment of the present disclosure.
Figure 10:
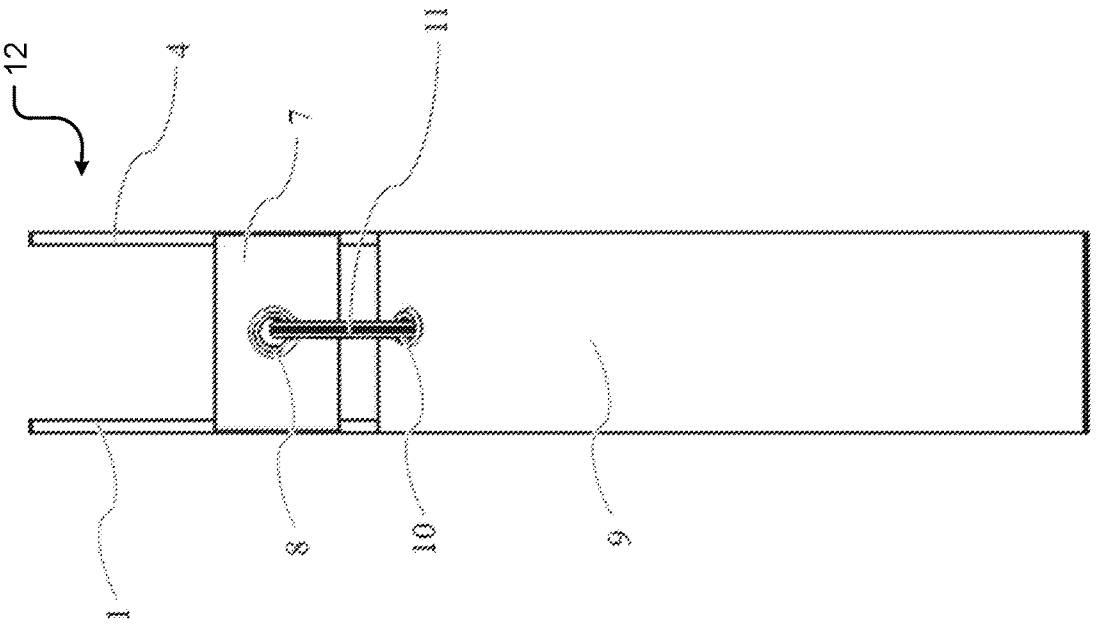
FIG. 10 is a rear view of the gasket in the second position, the connecting ring, and the streamer of FIG. 1 according to at least one embodiment of the present disclosure.
Figure 9:
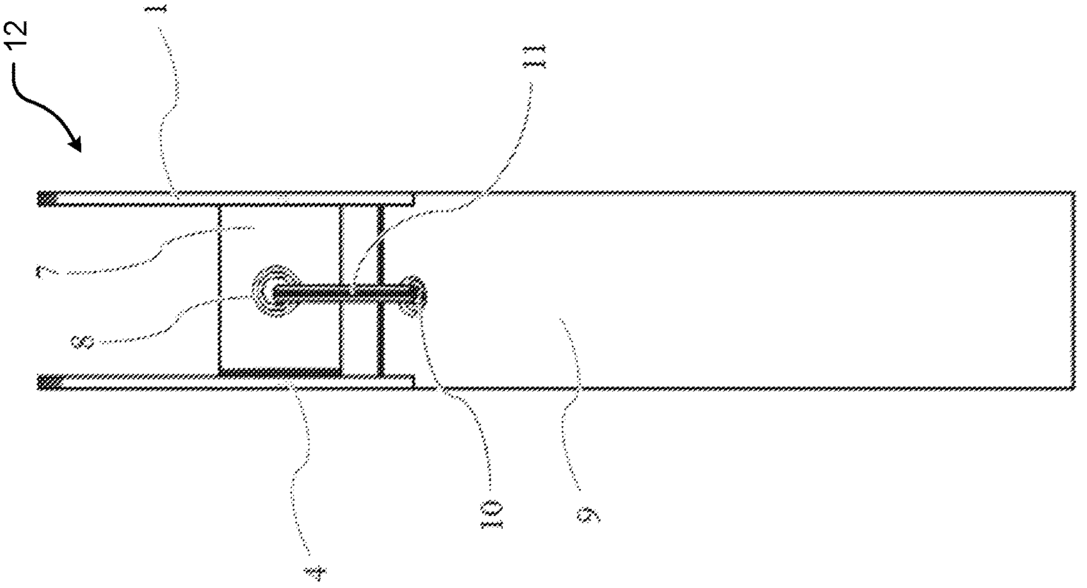
FIG. 9 is a front view of the gasket in the second position, the connecting ring, and the streamer of FIG. 1 according to at least one embodiment of the present disclosure.

Turning first to FIGS. 1-10, the gasket 12, a connecting ring 11, and a streamer 9 are shown in various views and positions. More specifically, FIG. 1 is a bottom left perspective view of the gasket 12 in a first position; FIG. 2 is a left side view of the gasket in the first position; FIG. 3 is a side perspective view of the gasket in a second position; FIG. 4 is a bottom perspective view of the gasket in the second position; FIG. 5 is a left side view of the gasket in the second position; FIG. 6 is a right side view of the gasket in the second position; FIG. 7 is a bottom view of the gasket in the second position; FIG. 8 is a top view of the gasket in the second position; FIG. 9 is a front view of the gasket in the second position; and FIG. 10 is a rear view of the gasket in the second position.

The gasket 12 is configured to prevent contact between the mount link 13 and the turbine frame mount 17 when positioned on a turbine frame pawl pin 14 of the turbine 18, as will be discussed and shown in greater detail in FIGS. 11-16. The gasket 12 comprises a first spacer 1 and a second spacer 4 connected together by a connector 7. As illustrated, the first spacer 1, the second spacer 4, and the connector 7 are formed from one piece, though it will be appreciated that in other embodiments the first spacer 1, the second spacer 4, and the connector 7 may be formed from multiple pieces that are coupled or otherwise attached together using, for example, adhesion, connectors, rivets, twine, metal twine, etc.

Each of the first spacer 1 and the second spacer 4 include a first pin cutout 2 and a second pin cutout 5, respectively. Each of the first pin cutout 2 and the second pin cutout 5 are configured to secure the first spacer 1 and the second spacer 4 to the turbine frame pawl pin 14. As shown, the first pin cutout 2 and the second pin cutout 5 comprise a circular aperture. In other embodiments, the first pin cutout 2 and the second pin cutout 5 may be any shape or size including, for example, a triangle, an oval, a rectangle, a star, or the like, and may be larger or smaller than shown in FIG. 1. In the illustrated embodiment, the first pin cutout 2 and the second pin cutout 5 are the same size. In other embodiments, the first pin cutout 2 and the second pin cutout 5 may be different sizes.

The first spacer 1 and the second spacer 4 also include a first pin groove 3 and a second pin groove 6, respectively. The first pin groove 3 and the second pin groove 6 connect to the first pin cutout 2 and the second pin cutout 5, respectively, so as to enable the turbine frame pawl pin 14 to pass through the first pin groove 3 and the second pin groove 6 and into the first pin cutout 2 and the second pin cutout 5. The first pin groove 3 and the second pin groove 6 each have a distance D1, D2 (shown in FIG. 2) respectively that is less than a diameter or length of the first pin cutout 2 and the second pin cutout 5. Thus, when the turbine frame pawl pin 14 is positioned in the first pin cutout 2 and the second pin cutout 5, the first spacer 1 and the second spacer 4 are less likely to become dislodged from the turbine frame pawl pin 14.

The first spacer 1 and the second spacer 4 are circular shaped with a flat portion 24, 26, respectively, adjacent to opposite sides of the first pin groove 3 and the second pin groove 6. In other words, the first and second spacers 1, 4 are shaped like a circle with the bottom portion of the circle cut off. In some embodiments, the flat portion 24, 26 may be adjacent to only one side of the first pin groove 3 and/or the second pin groove 6, respectively. In other embodiments, the flat portion 24, 26 may be positioned anywhere on the first spacer 1 and/or the second spacer 4, respectively. In still other embodiments, the first spacer 1 and/or the second spacer 4 may not include the flat portion 24, 26, respectively. It will be appreciated that in other embodiments, the first spacer 1 and the second spacer 4 may be any shape or size, for example, oval shaped, square shaped, rectangular shaped, etc. Additionally, the first and second spacers 1, 4 may be larger or smaller than shown in FIGS. 1-10. Further, the first spacer 1 and the second spacer 4 may be different shapes and/or sizes from each other.

The first spacer 1 and the second spacer 4 each have a thickness sufficient to prevent contact between the mount link 13 and the turbine frame mount 17. For example, the thickness may be between about ⅛" and ½". In some embodiments, the thickness of the first spacer 1 is the same as the thickness of the second spacer 4. In alternative and additional embodiments, the first spacer 1 may be thicker or thinner than the second spacer 4. As previously described, the first spacer 1 and the second spacer 4 are connected to each other by the connector 7. The connector 7 as illustrated is rectangular, though the connector 7 may be any shape or size in other instances, for example, wider/taller and/or longer. The connector 7 also has a length L to accommodate the thickness or width of the mount link 13 of the turbine mount assembly 19 between the first spacer 1 and the second spacer 4. As illustrated, the length L in FIGS. 1-2 may be longer than the length L as shown in FIGS. 3-8. It will be appreciated that the length L may be any length.

The connector 7 has multiple purposes. For example, the connector 7 improves ease of use of the gasket 12 as the first spacer 1 can first be connected to the turbine frame pawl pin 14 and the second spacer 4 can be easily connected to the turbine frame pawl pin 14 (after the first spacer 1) without the need to hold the first spacer 1 in place. The connector 7 also prevents one spacer 1, 4 from being lost, for example if two separate spacers are used rather than two spacers 1, 4 joined by a connector 7. Additionally, when two or more conventional wooden shims are positioned between the mount link 13 and the turbine frame mount 17, one of the wooden shims may fall out if not secured in place. In some prior art embodiments, one or more wooden shims were positioned between one side of the mount link 13, e.g., right side, and one turbine frame mount 17 and one or more additional wooden shims (unconnected from the one or more wooden shims) were positioned between the other side of the mount link 13, e.g., left side, and another turbine frame mount 17. In other embodiments, one wooden shim may fall out if not secured in place. On the other hand, because the first spacer 1 and the second spacer 4 are connected to each other, one of the spacers 1, 4 is less likely to fall out if the other spacer 1, 4 is still secured to the turbine frame pawl pin 14.

The connector 7 includes a grommet 8 configured to receive a connecting ring 11. The connecting ring 11 is also received by a streamer grommet 10 of a streamer 9, thereby connecting the streamer 9 to the connector 7 (and thus, the gasket 12). The grommet 8, the connecting ring 11, and the streamer grommet 10 may be formed from any solid material such as, for example, plastic, metal, metal alloys, composite materials, rubber, silicone, or the like. In some embodiments, the streamer 9 may be permanently attached to the turbine mount gasket 12 and such attachment may not use a grommet 10 and/or connecting ring 11. For example, the streamer 9 may be formed as a part of the turbine mount gasket 12 and may be one piece with and the same material as the turbine mount gasket 12. In the illustrated embodiment, the streamer 9 is rectangular, though in other embodiments the streamer 9 may be any shape and/or size. The streamer 9 acts as an identifier for the gasket 12 as the streamer 9 may be more visible to a user than the gasket 12 (which may be partially obscured by, for example, the turbine 18 and/or the turbine mount assembly 19). Further, the streamer 9 may include information or identification printed, embroidered, or otherwise disposed on one or more surfaces of the streamer 9.

The gasket 12 may be formed from an elastic, flexible material such as, for example, rubber, silicone or polysiloxane, thermoplastic olefin, thermoplastic polyolefin, or thermoplastic elastomer. When formed from the elastic, flexible material the gasket 12 may be positioned in any number of positions. For example, the gasket 12 may be shipped or stored in a first position—shown in FIGS. 1 and 2—then moved into a second position—shown in FIGS. 3-10—to be positioned around the mount link 13 (of the turbine mount assembly 19) and onto the turbine frame pawl pin 14. In other embodiments, the gasket 12 may be formed from any solid material such as, for example, wood, metal, metal alloys, composite materials, etc. In such embodiments, the gasket 12 may be pre-formed in the second position. The gasket 12 is shown flat when in the first position. In other words, the first spacer 1 and the second spacer 4 may lay in the same plane when the gasket 12 is in the first position. The gasket 12, when in the second position, is shown bent or rounded at the connector 7 such that the first spacer 1 and the second spacer 4 are parallel to each other and spaced from each other.

Figure 11:
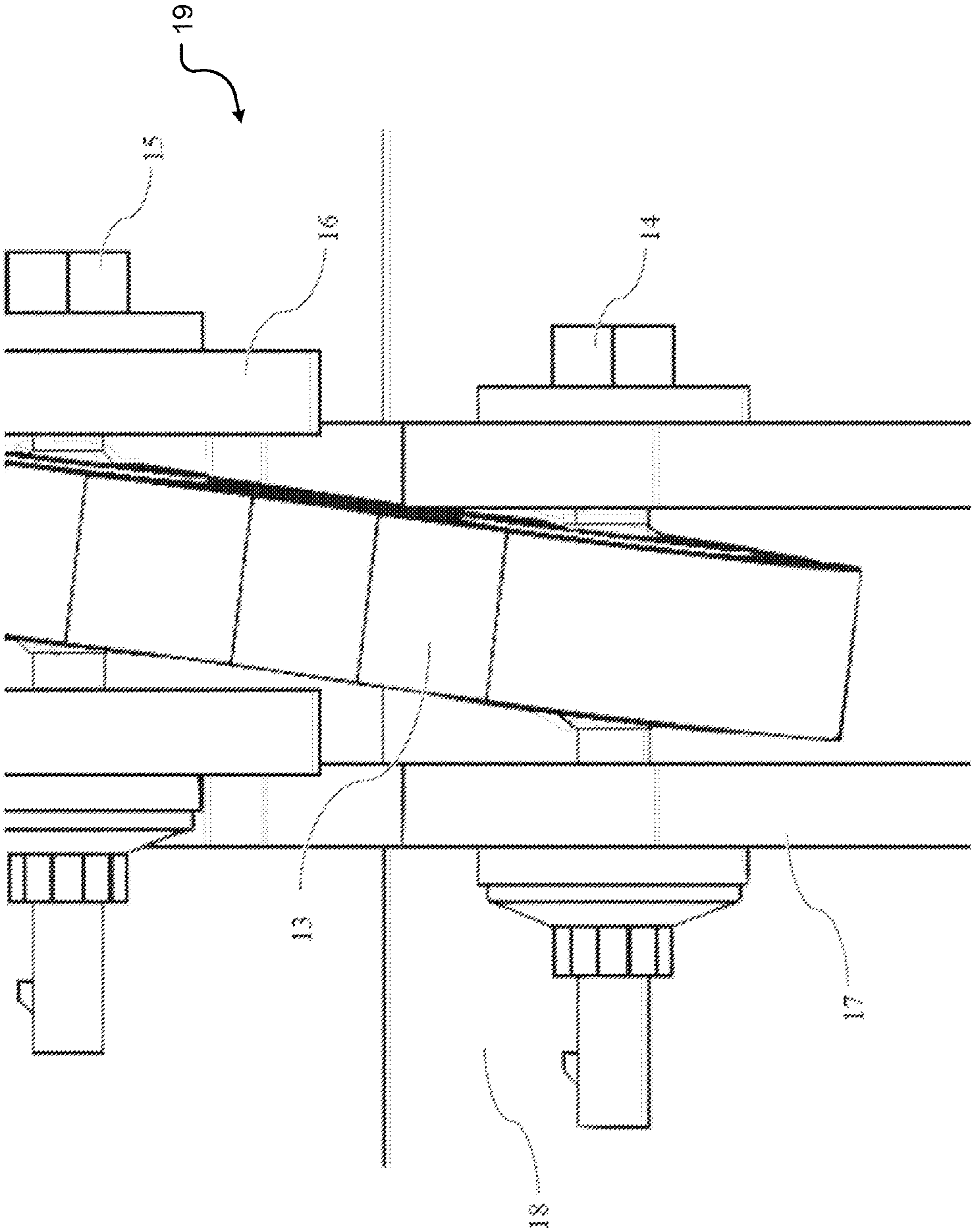
FIG. 11 is a front view of a turbine mount assembly on a turbine housing according to at least one embodiment of the present disclosure.
Figure 12:
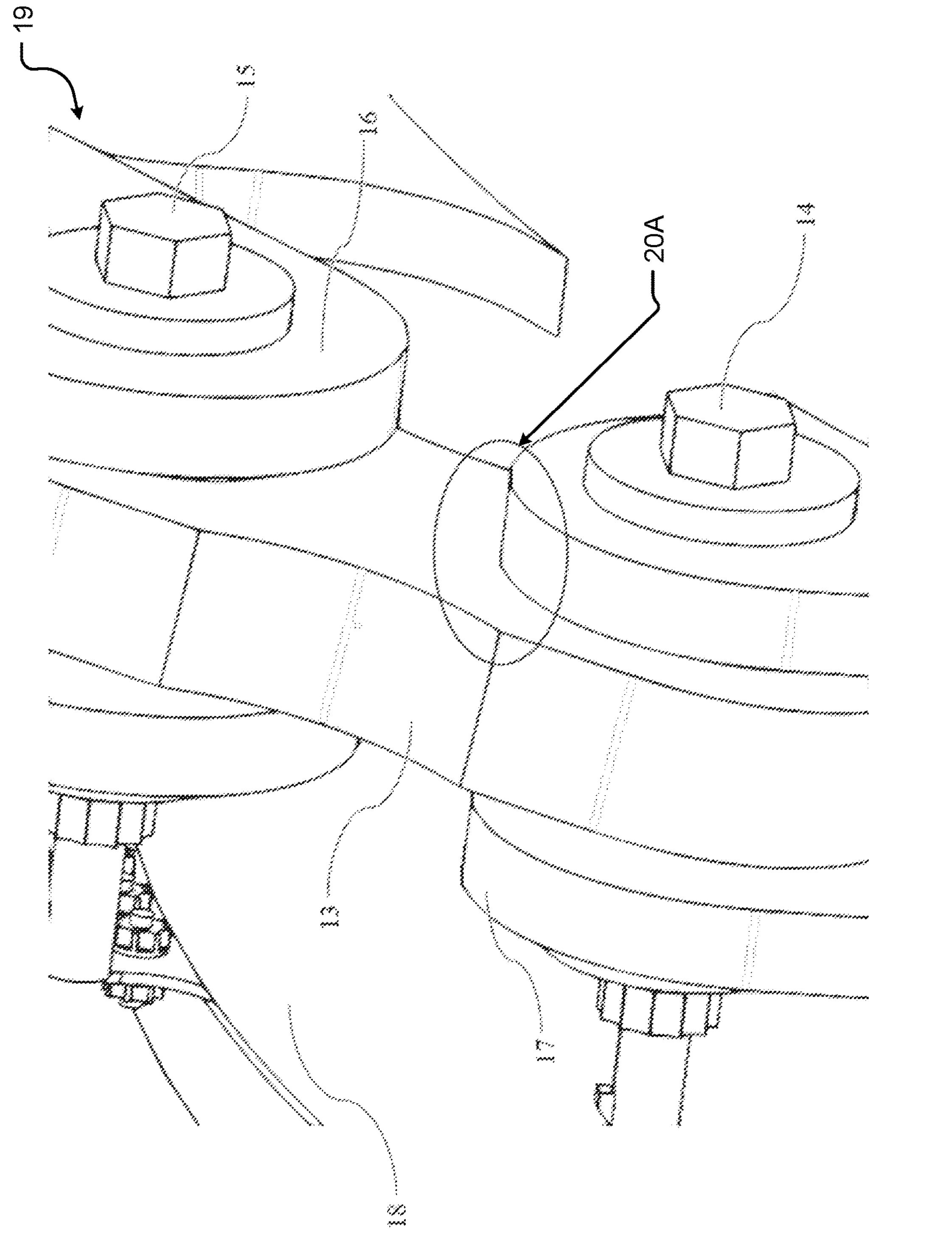
FIG. 12 is a close-up top, front perspective view of the turbine mount assembly and turbine housing of FIG. 11 according to at least one embodiment of the present disclosure.

Turning to FIGS. 11 and 12, the turbine 18 and the turbine mount assembly 19 are shown without the gasket 12 so as to illustrate the undesirable contact between the mount link 13 and the turbine frame mount 17. Generally, the turbine 18 includes the turbine frame mount 17 extending from a turbine 18, specifically extending from a turbine housing, and a turbine frame pawl pin 14 disposed in apertures (not visible) of the turbine frame mount 17 and mount link 13. The turbine mount assembly 19 includes a turbine fitting arm 16 and a mount link 13 that is connected to the turbine fitting arm 16 via a turbine mount pawl pin 15 and the mount link 13 is connected to the turbine 18 via the turbine frame pawl pin 14 and turbine frame mount 17. The mount link 13 is also positioned between two flanges that form the turbine frame mount 17. The flanges are permanently attached to the turbine, specifically the flanges are permanently attached to an outer surface of the turbine housing.

As shown in FIG. 11, when the turbine mount assembly 19 is in an un-suspended state (e.g., not installed on the aircraft), the turbine mount assembly 19 and thereby the mount link 13 can shift or move such that the mount link 13 contacts the turbine frame mount 17. This issue does not arise when the turbine mount assembly 19 is attached to the aircraft and the turbine 18 hangs down from the turbine mount assembly 19 and the aircraft is in motion because the thrust from the turbine 18 holds the turbine mount assembly 19 rigid relative to the turbine 18. As also shown in FIG. 12, an undesired point of contact between the mount link 13 and the turbine frame mount 17 is detailed by the circle 20A. It will be appreciated that the circle 20A is shown for clarity only. As previously described, because the mount link 13 is formed from a material softer than the turbine frame mount 17, the turbine frame mount 17 may dent or otherwise damage the mount link 13 at the point of contact.

Figure 13:
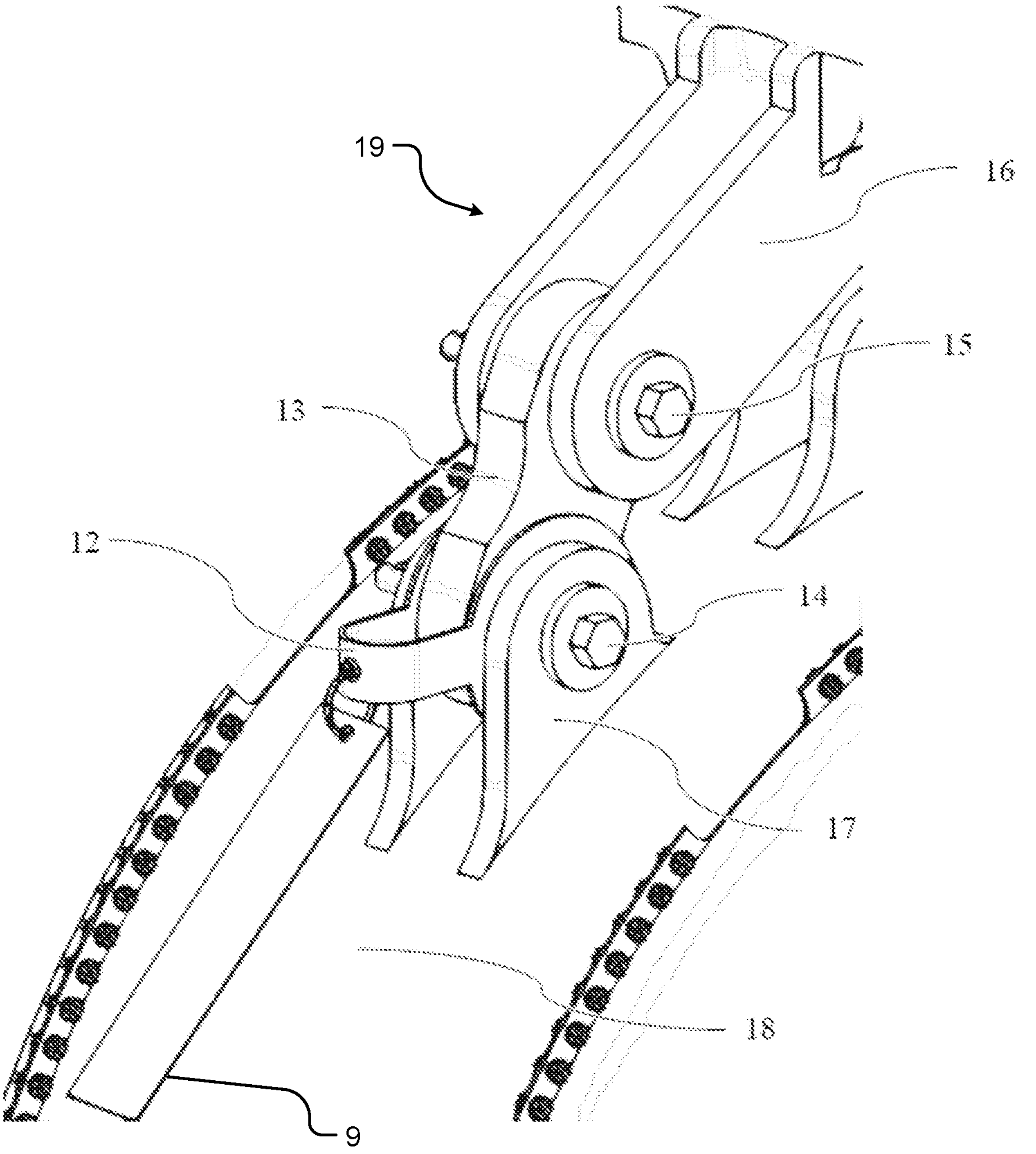
FIG. 13 is a front, side perspective view of a gasket installed on a turbine mount assembly according to at least one embodiment of the present disclosure.
Figure 14:
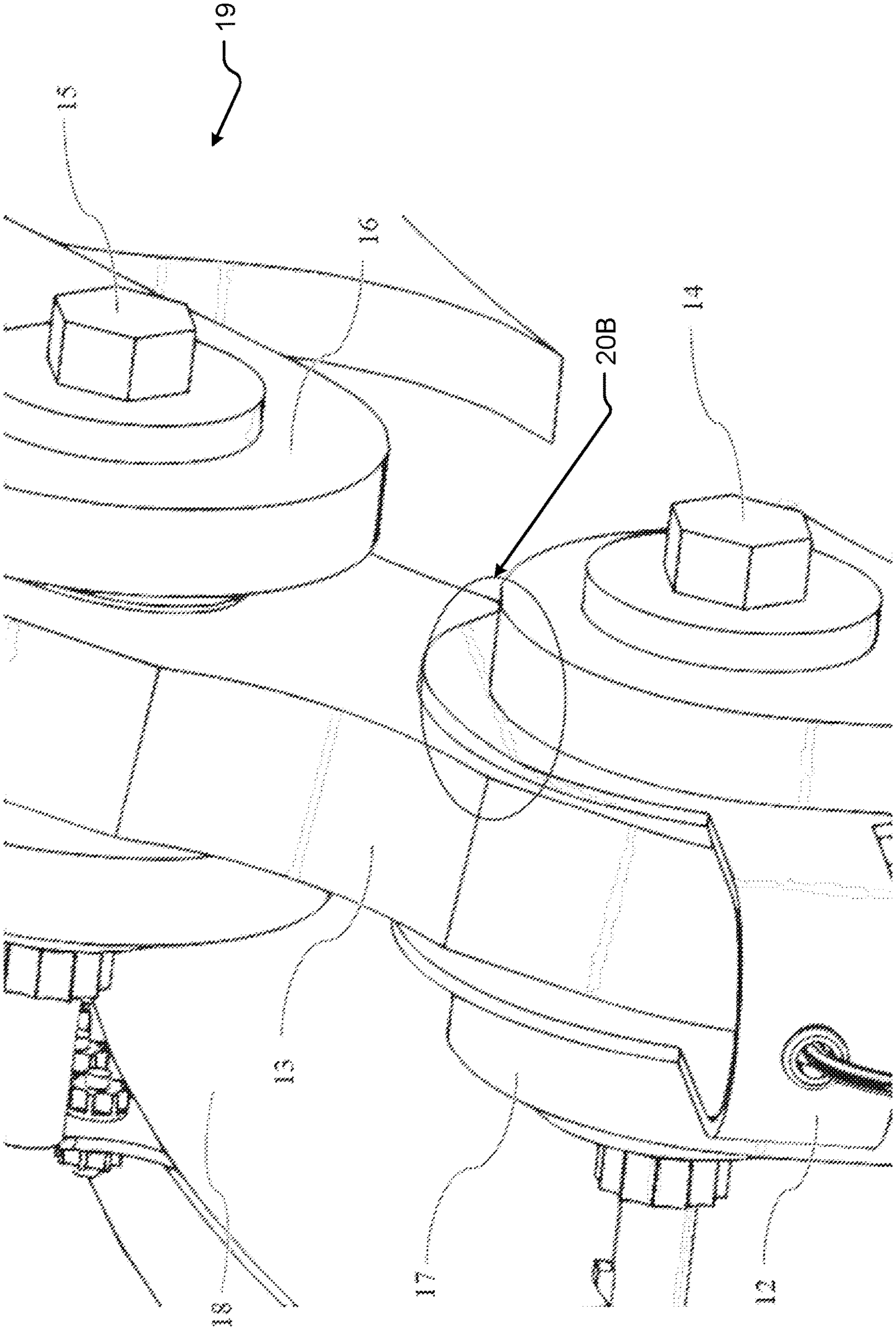
FIG. 14 is a close-up top, front perspective view of the gasket installed on the turbine mount assembly of FIG. 13 according to at least one embodiment of the present disclosure.
Figure 15:
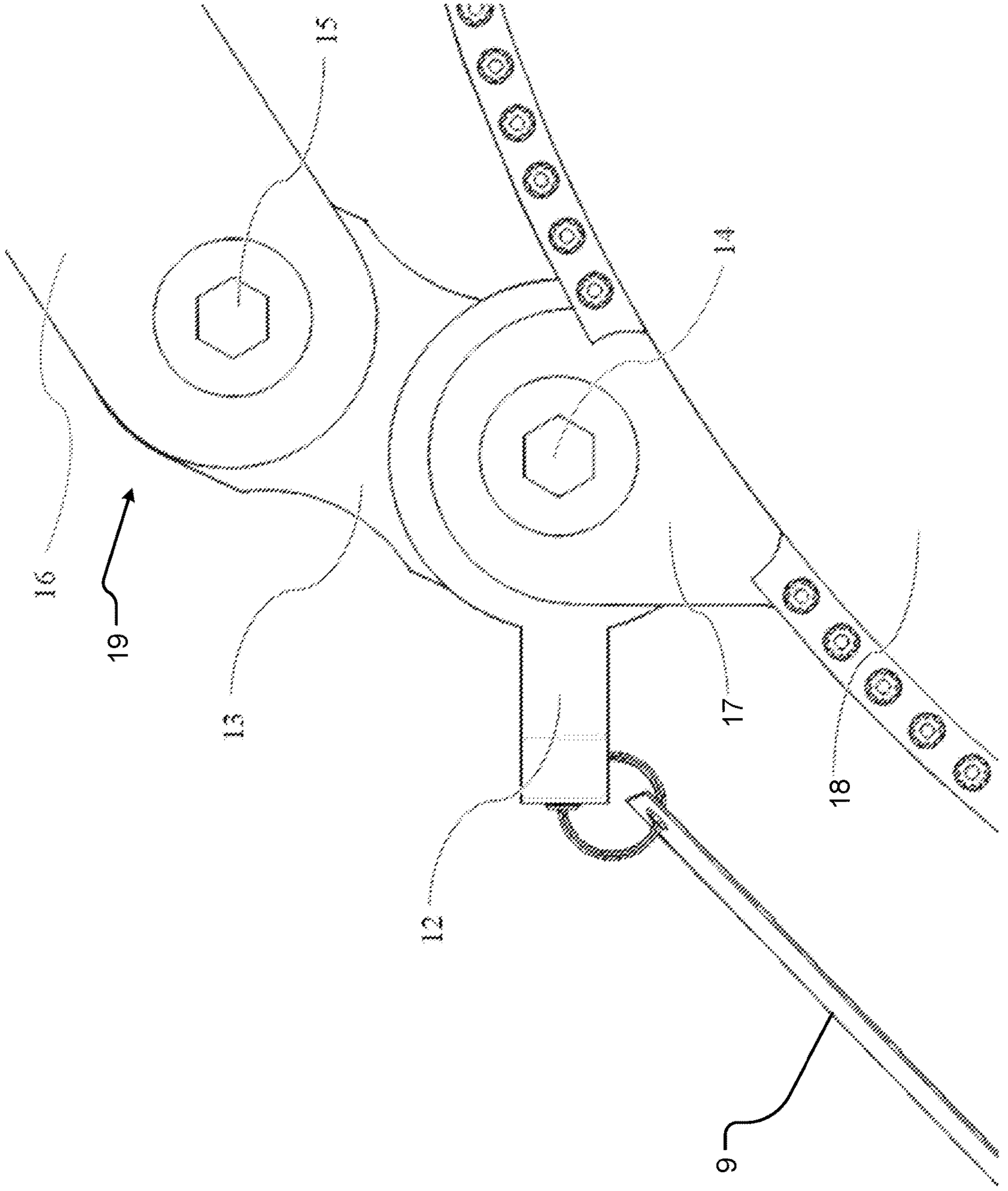
FIG. 15 is a side view of the gasket installed on the turbine mount assembly of FIG. 13 according to at least one embodiment of the present disclosure.
Figure 16:
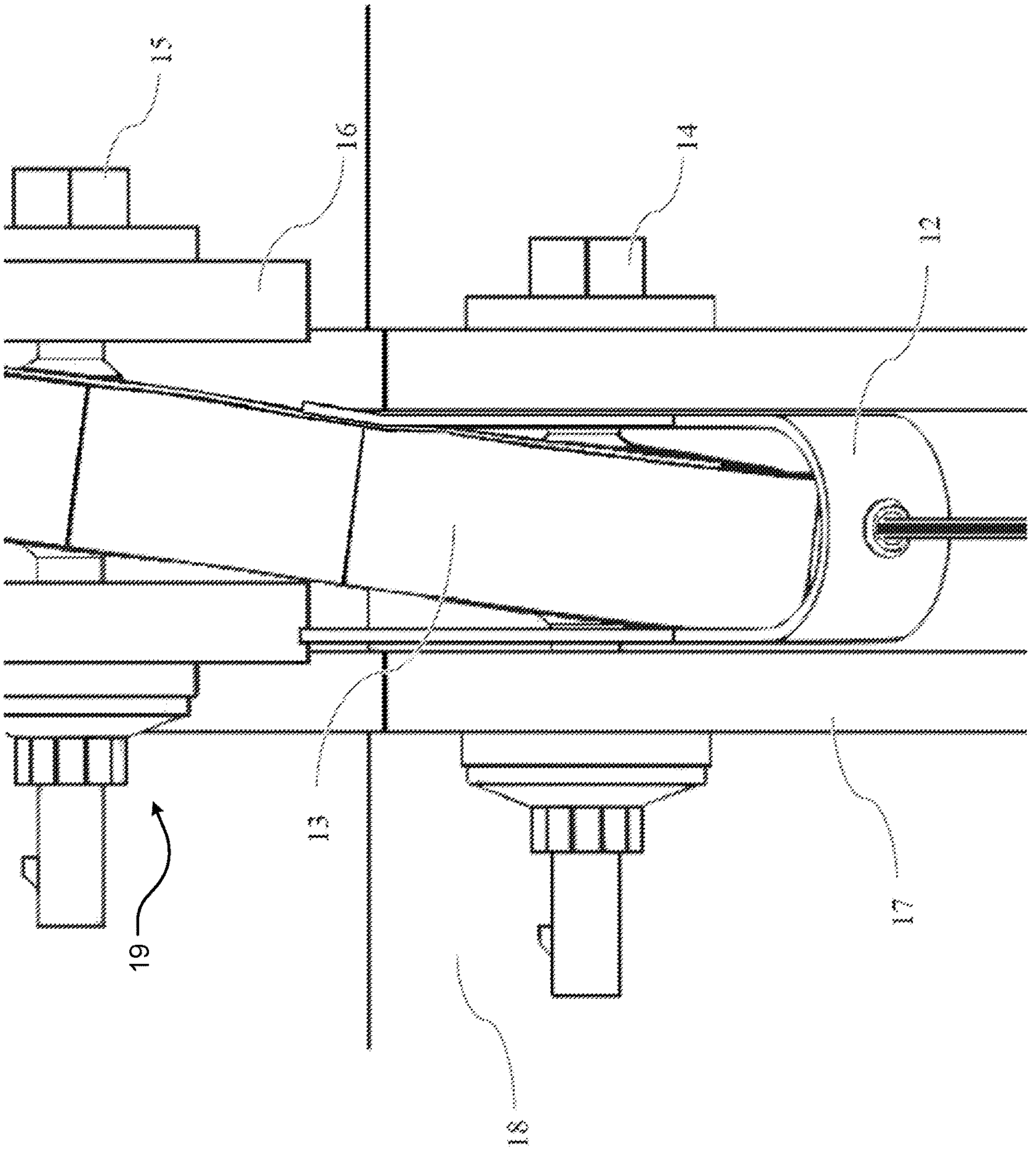
FIG. 16 is a front view of the gasket installed on the turbine mount assembly of FIG. 13 according to at least one embodiment of the present disclosure.

Turning to FIGS. 13-16, the turbine 18 and the turbine mount assembly 19 are shown with the gasket 12 positioned between the mount link 13 and the turbine frame mount 17. More specifically, FIG. 13 is a front, side perspective view of the gasket 12 installed on the turbine mount assembly 19; FIG. 14 is a close-up top, front perspective view of the gasket 12 installed on the turbine mount assembly 19; FIG. 15 is a side view of the gasket 12 installed on the turbine mount assembly 19; and FIG. 16 is a front view of the gasket 12 installed on the turbine mount assembly 19.

As shown, the turbine frame pawl pin 14 is received by the first pin cutout 2 and the second pin cutout 5 of the first spacer 1 and the second spacer 4, respectively. The turbine frame pawl pin 14 is received by the first and second pin cutouts 2, 5 by expanding the first pin groove 3 and the second pin groove 6, respectively, such that the turbine frame pawl pin 14 can pass through the first pin groove 3 and the second pin groove 6 and into the first pin cutout 2 and the second pin cutout 5. When the turbine frame pawl pin 14 is positioned in the first pin cutout 2 and the second pin cutout 5, the first spacer 1 and the second spacer 4 are positioned between opposite sides of the mount link 13 and the two turbine frame mounts 17. Thus, the first spacer 1 and the second spacer 4 physically prevent the mount link 13 from contacting the turbine frame mount 17. As shown in FIG. 14, a point of no-contact between the mount link 13 and the turbine frame mount 17 is detailed by the circle 20B as the first spacer 1 (or the second spacer 4) physically prevents contact between the mount link 13 and the turbine frame mount 17. It will be appreciated that the circle 20B is shown for clarity only. As also shown in FIGS. 13 and 15, once the gasket 12 is in place, the streamer 9 may freely hang from the gasket 12 or more specifically, from the grommet 8 of the connector 7. The streamer 9 may be useful for, for example, flagging and identifying the gasket 12 for removal prior to installation of the turbine 18 onto an aircraft.

Figure 17:
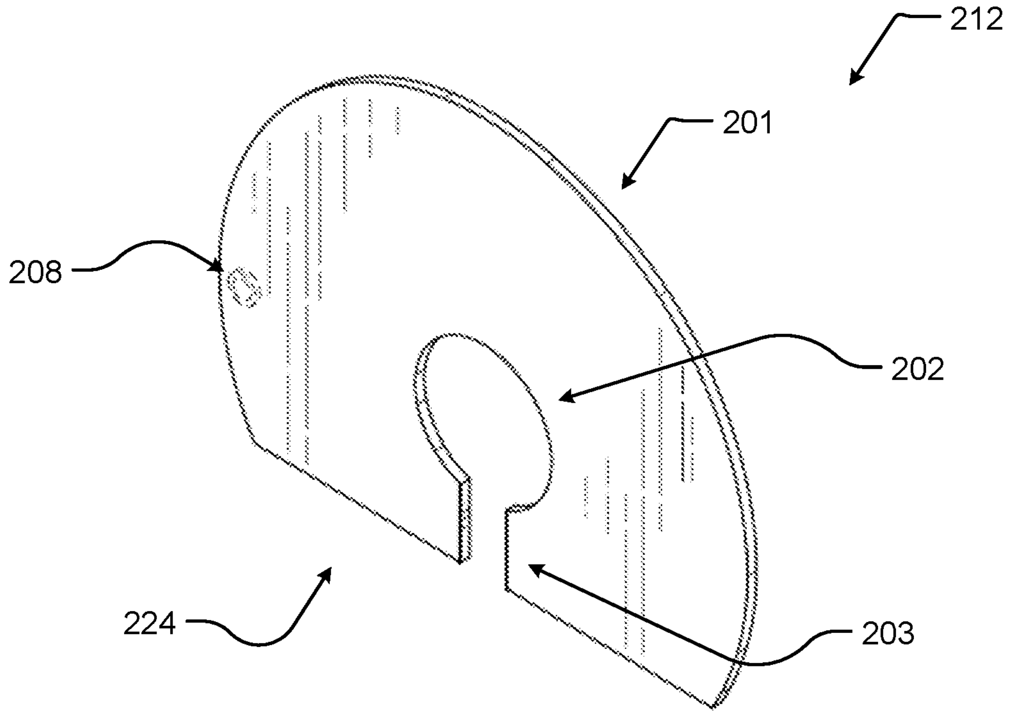
FIG. 17 is a side perspective view of a gasket according to at least one embodiment of the present disclosure.
Figure 18:
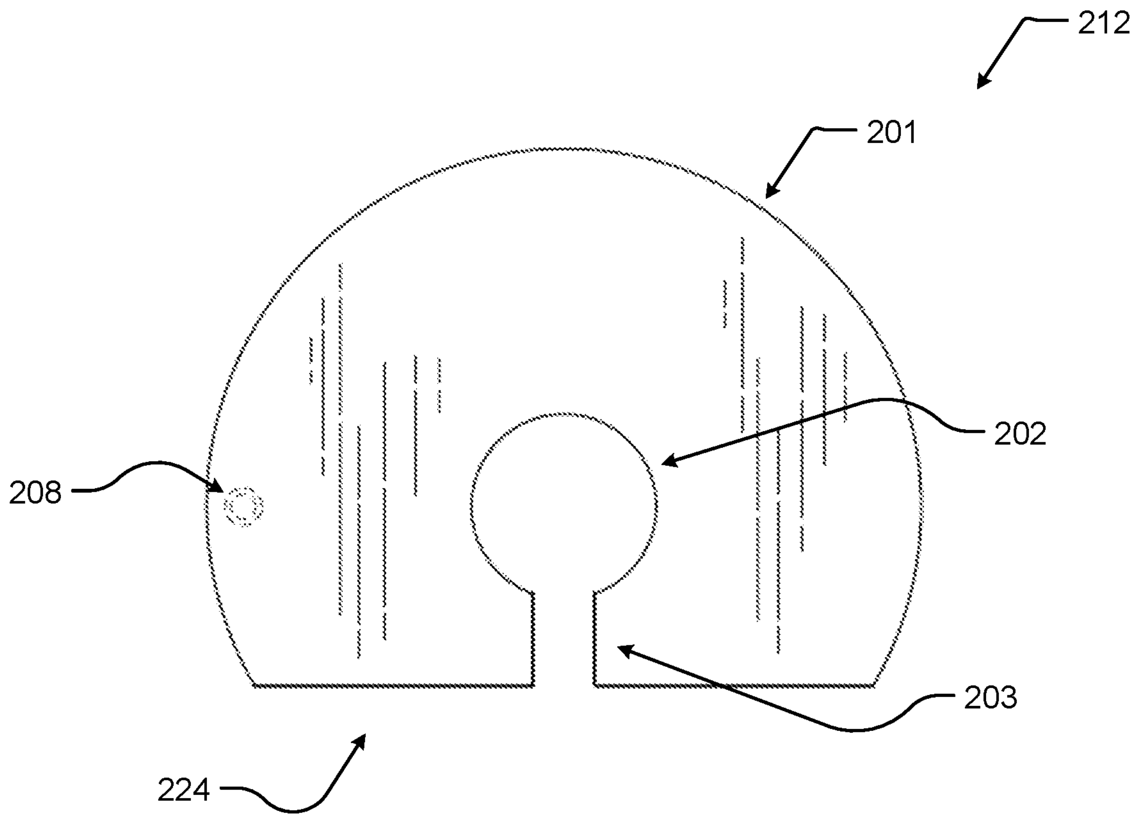
FIG. 18 is a side view of the gasket of FIG. 17 according to at least one embodiment of the present disclosure.

Turning to FIGS. 17 and 18, a front perspective view and a front review, respectively, of another embodiment of a gasket 212 is shown. The gasket 212 may be the same as or similar to the gasket 12 and any component of the gasket 12 is herein incorporated by reference. The gasket 212 includes a spacer 201 having a pin cutout 202 and a pin groove 203. As shown, the pin cutout 202 a circular aperture. In other embodiments, pin cutout 202 may be any shape or size including, for example, a triangle, an oval, a rectangle, a star, or the like, and may be larger or smaller than shown in FIGS. 17-18. The pin groove 203 connects to the pin cutout 202 so as to enable the turbine frame pawl pin 14 to pass through the pin groove 203 and into the pin cutout 202.

As illustrated, the spacer 201 is circular shaped with a flat portion 224 adjacent to opposite sides of the pin groove 203. In other embodiments, the flat portion 224 may be positioned anywhere on the spacer 201. In still other embodiments, the spacer 201 may not include the flat portion 224. It will be appreciated that in other embodiments, the spacer 201 may be any shape or size has a thickness sufficient to prevent contact between the mount link 13 and the turbine frame mount 17. The spacer 201 includes a grommet 208 configured to receive a connecting ring (not shown) that may be the same as or similar to the connecting ring 11 shown in FIGS. 1-16. The connecting ring is also received by a streamer grommet which may be the same as or similar to the streamer grommet 10 of a streamer which may be the same as or similar to the streamer 9 of FIGS. 1-16, thereby connecting the streamer to the gasket 212. The grommet 208, the connecting ring, and the streamer grommet may be formed from any solid material such as, for example, plastic, metal, metal alloys, composite materials, rubber, silicone or polysiloxane, thermoplastic olefin, thermoplastic polyolefin, thermoplastic elastomer, etc. As previously described in connection with FIGS. 1-16, the streamer acts as an identifier for the gasket 212 as the streamer may be more visible to a user than the gasket 212 (which may be partially obscured by, for example, the turbine 18 and/or the turbine mount assembly 19 of FIGS. 11-16 and 21). Further, the streamer may include information or identification printed, embroidered, or otherwise disposed on a surface of the streamer.

The gasket 212 may be formed from an elastic, flexible material such as, for example, rubber, silicone or polysiloxane, thermoplastic olefin, thermoplastic polyolefin, or thermoplastic elastomer. In other embodiments, the gasket 212 may be formed from any solid material such as, for example, wood, metal, metal alloys, composite materials, etc.

Figure 19:
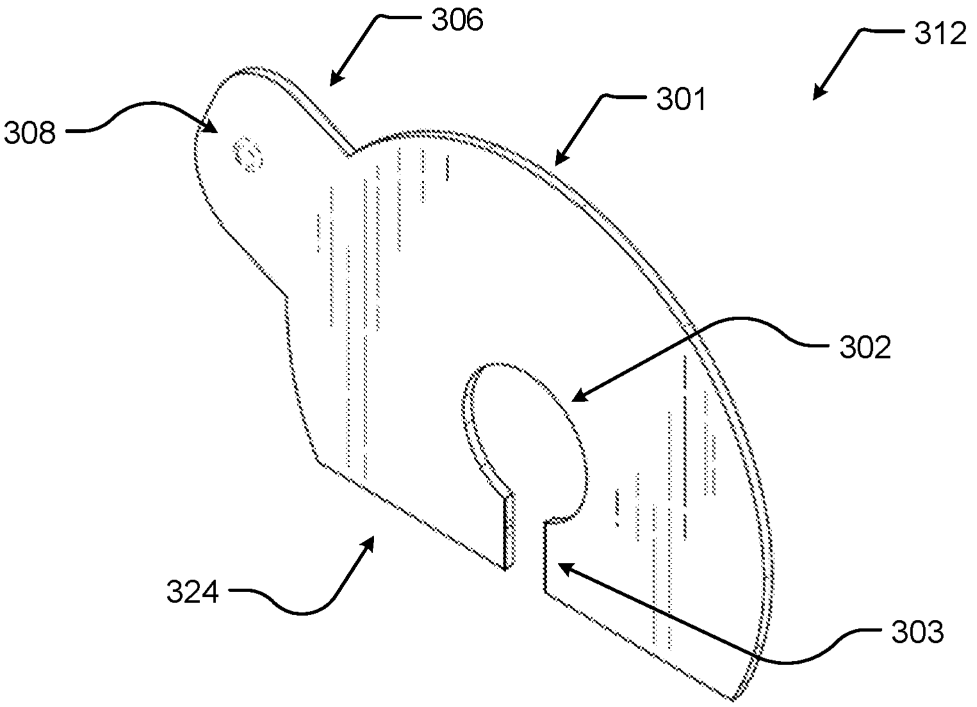
FIG. 19 is a side perspective view of a gasket according to at least one embodiment of the present disclosure.
Figure 20:
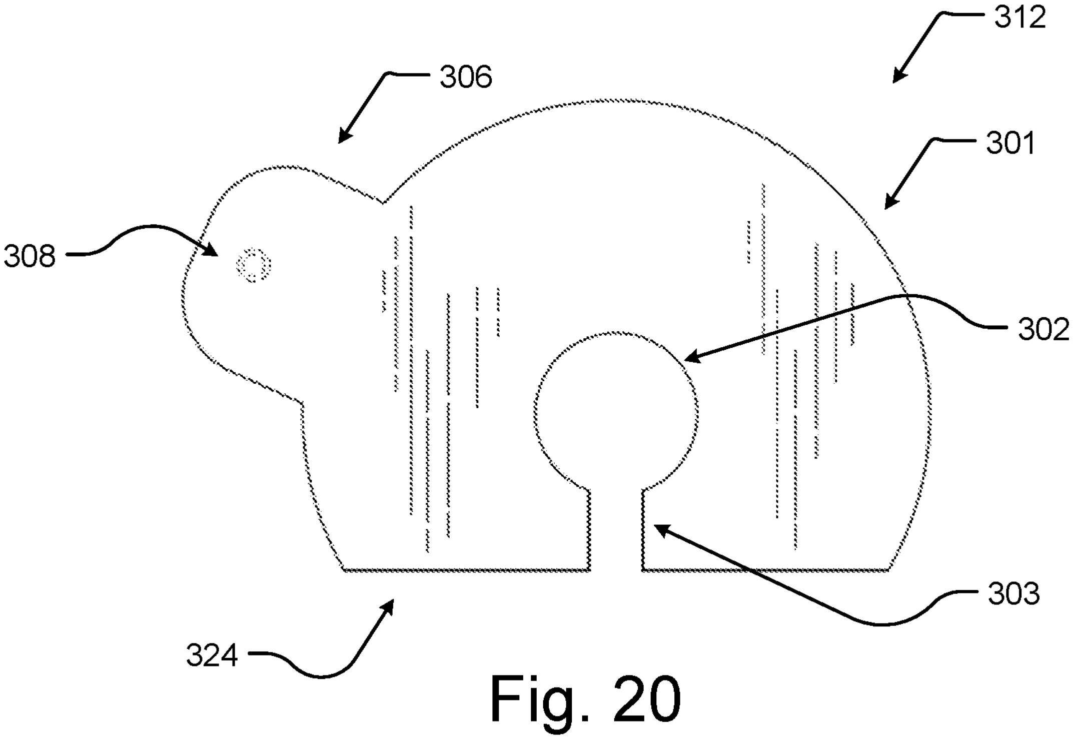
FIG. 20 is a side view of the gasket of FIG. 19 according to at least one embodiment of the present disclosure.

Turning to FIGS. 19 and 20, a front perspective view and a front view, respectively, of another embodiment of a gasket 312 is shown. The gasket 312 may be the same as or similar to the gasket 12 and any component of the gasket 12 is herein incorporated by reference The gasket 312 is similar to the gasket 212 of FIGS. 17-18, except that the gasket 312 includes an extension 306 on which a grommet 308 is positioned. The grommet 308 is configured to receive a connecting ring (not shown) that may be the same as or similar to the connecting ring 11 of FIGS. 1-16. The connecting ring is also received by a streamer grommet which may be the same as or similar to the streamer grommet 10 of a streamer which may be the same as or similar to the streamer 9 of FIGS. 1-16, thereby connecting the streamer to the gasket 212. The gasket 312 includes a spacer 301 from which the extension 306 extends. The spacer 301 includes a pin cutout 302 and a pin groove 303 which are the same as or similar to the pin cutout 202 and the pin groove 203 of FIGS. 17-18. The spacer 301 is also circular shaped with a flat portion 324, though the spacer 301 may be any shape or size. The gasket 312 may be formed from an elastic, flexible material such as, for example, rubber, silicone or polysiloxane, thermoplastic olefin, thermoplastic polyolefin, or thermoplastic elastomer. In other embodiments, the gasket 312 may be formed from any solid material such as, for example, wood, metal, metal alloys, composite materials, etc.

Figure 21:
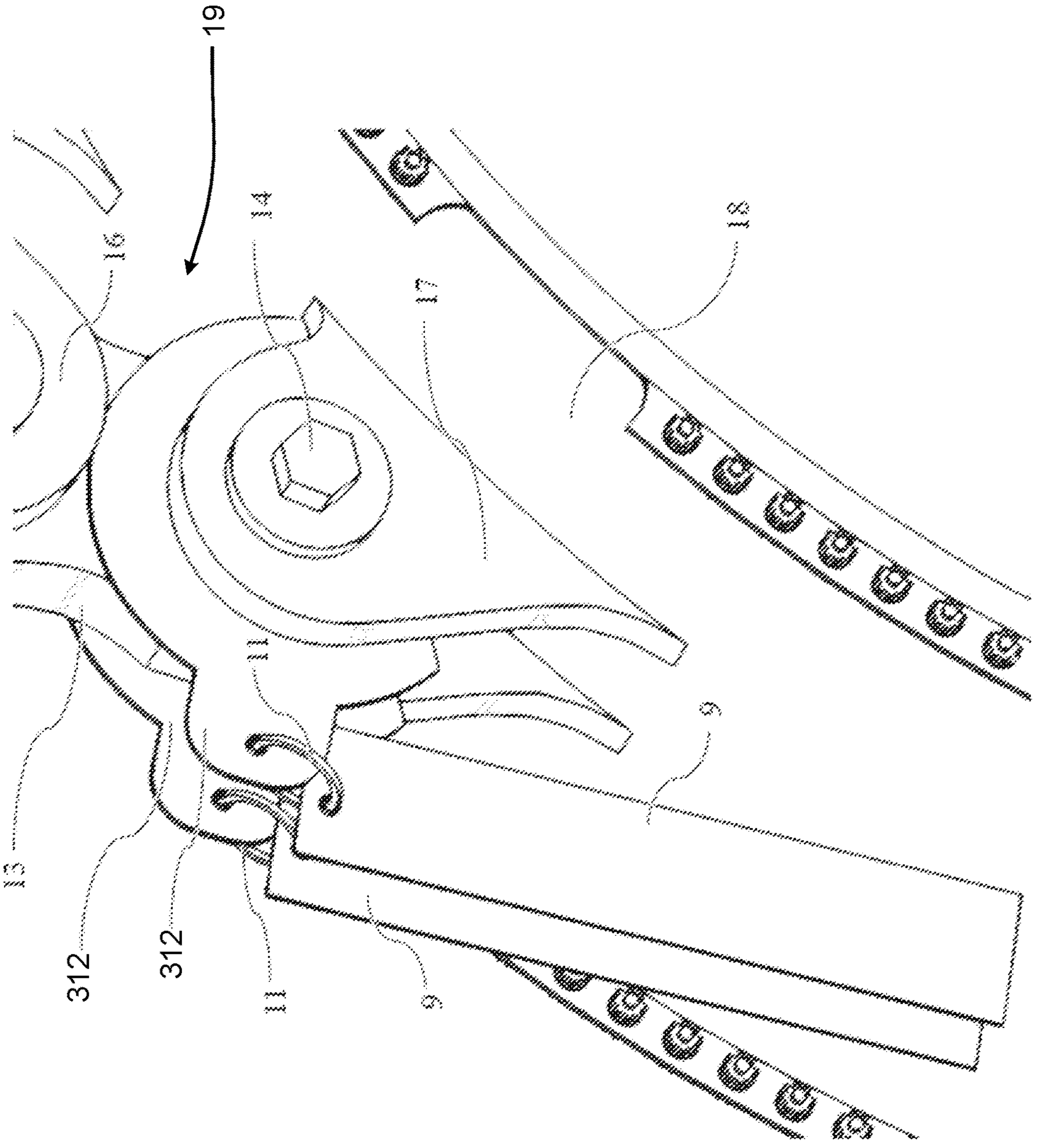
FIG. 21 is a front, side perspective view of a pair of gaskets installed on a turbine mount assembly according to at least one embodiment of the present disclosure.

Turning to FIG. 21, a pair of gaskets 312 are shown positioned on the turbine frame pawl pin 14 and between the mount link 13 and the turbine frame mount 17, specifically the two flanges that form the turbine frame mount 17. The pair of gaskets 312, when positioned between the mount link

13 and the turbine frame mount 17, prevent undesired contact between the mount link 13 and the flanges of the turbine frame mount 17.

It will be appreciated that any gasket 12, 212, 312 described herein may be positioned between the mount link 13 and the turbine frame mount 17 flanges to prevent contact between the mount link 13 and the turbine frame mount 17 flanges. Further, the gasket 12, 212, 312 may include any number of spacers, pin cutouts, pin grooves, and/or connectors and the spacers, pin cutouts, pin grooves, and/or connectors can be any shape or size that is practical and remain within the scope of the present disclosure.

Figure 22:
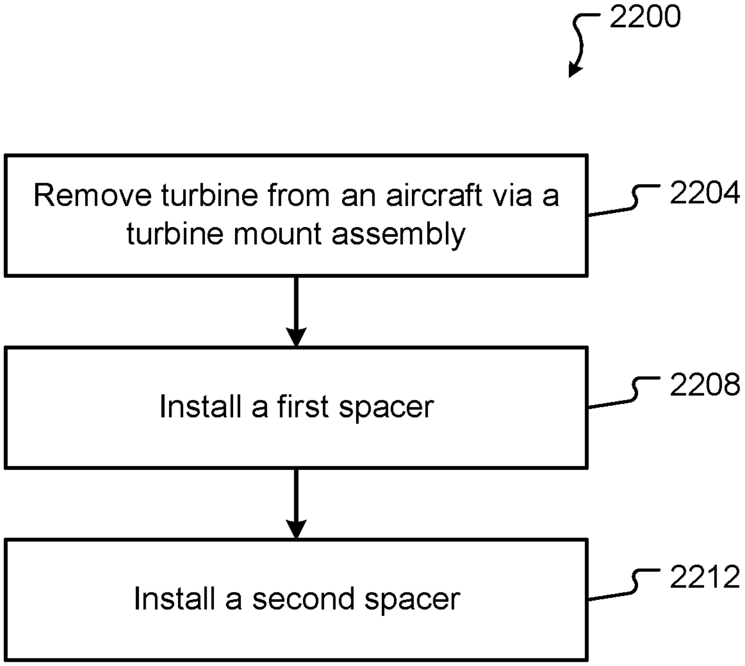
FIG. 22 is a flowchart for a method of installing a gasket onto a turbine according to at least one embodiment of the present disclosure.

Turning to FIG. 22, a flowchart for a method 2200 for installing a gasket (such as the gasket 12, 212, 312) onto a turbine mount assembly (such as the turbine mount assembly 19) is shown.

The method 2200 includes removing the turbine via the turbine mount assembly (e.g., 18 and 19 respectively) from an aircraft by removing the turbine mount assembly (such as the turbine mount assembly 190, which is attached to the turbine) from the aircraft (step 2204). Once the turbine 18 and turbine mount assembly 19 are disconnected from the aircraft, the turbine mount assembly 19 and the turbine 18 are in a non-suspended state. In such state, a mount link such as the mount link 13 of the turbine mount assembly 19 may tilt or move such that the mount link contacts a turbine frame mount such as the flanges of the turbine frame mount 17 attached to the turbine. To prevent such contact, the gasket is positioned between the mount link and the turbine frame mount, as described below.

The method also includes installing a first spacer (step 2208). The first spacer may be installed between a first component such as, for example, the mount link and a second component such as, for example, a first flange of the turbine frame mount. The first spacer may be the same as or similar to the first spacer 1 or the spacer 201, 301. The first spacer includes a first pin cutout such as the first pin cutout 2 or the pin cutout 202, 302 and a first pin groove such as the first pin groove 3 or the pin groove 203, 303. As previously described, the first pin groove is able to expand so as to enable a turbine frame pawl pin such as the turbine frame pawl pin 14 of the turbine to pass through the first pin groove and into the first pin cutout, thereby securing the first spacer to the turbine frame pawl pin.

The method also includes installing a second spacer (step 2212). The second spacer may be installed between the first component such as, for example, the mount link and a third component such as, for example, a second flange of the turbine frame mount. The second spacer may be the same as or similar to the second spacer 4 or the spacer 201, 301. In embodiments where the second spacer is the same as or similar to the second spacer 4, the second spacer may be connected to the first space via a connector such as the connector 7. In embodiments where the second spacer is the same as or similar to the spacer 201, 301, the second spacer may be disconnected or separate from the first spacer. In other words, two separate gaskets may be installed on the turbine frame pawl pin. The second spacer includes a second pin cutout such as the second pin cutout 5 or the pin cutout 202, 302 and a second pin groove such as the second pin groove 6 or the pin groove 203, 303. As previously described, the second pin groove is able to expand so as to enable the turbine frame pawl pin 14 of the turbine to pass through the second pin groove and into the second pin cutout, thereby securing the second spacer to the turbine frame pawl pin.

The present disclosure encompasses embodiments of the method 2200 that comprise more or fewer steps than those described above, and/or one or more steps that are different than the steps described above.

The Appendix depicts one or more components of a gasket, turbine, and turbine mount assembly according to the embodiments of the present disclosure.

A number of variations and modifications of the foregoing disclosure can be used. It would be possible to provide for some features of the disclosure without providing others.

Although the present disclosure describes components and functions implemented in the aspects, embodiments, and/or positions with reference to particular standards and protocols, the aspects, embodiments, and/or positions are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or positions, includes components, methods, processes, systems and/or apparatus substantially as depicted and described herein, including various aspects, embodiments, positions embodiments, subcombinations, and/or subsets thereof. Those of skill in the art will understand how to make and use the disclosed aspects, embodiments, and/or positions after understanding the present disclosure. The present disclosure, in various aspects, embodiments, and/or positions, includes providing devices and processes in the absence of items not depicted and/or described herein or in various aspects, embodiments, and/or positions hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or positions for the purpose of streamlining the disclosure. The features of the aspects, embodiments, and/or positions of the disclosure may be combined in alternate aspects, embodiments, and/or positions other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or position. Thus, the following claims are hereby incorporated into this Detailed Description, with each claim standing on its own as a separate preferred embodiment of the disclosure.

Moreover, though the description has included description of one or more aspects, embodiments, and/or positions and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or positions to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A gasket comprising:

a first spacer having a first pin cutout and a first pin groove connected to the first pin cutout;

a second spacer having a second pin cutout and a second pin groove connected to the second pin cutout; and a connector coupling the first spacer to the second spacer, wherein the first pin groove and the second pin groove are each expandable to enable a turbine frame pawl pin to pass through and into each of the first pin groove and the second pin groove, and wherein the first spacer and the second spacer are each positioned between a mount link of a turbine mount assembly and a turbine frame mount of a turbine.

2. The gasket of claim 1, wherein each of the first spacer and the second spacer have a circular shape with a flat portion adjacent to opposite sides of the first pin groove and the second pin groove, respectively.

3. The gasket of claim 1, wherein the first spacer and the second spacer are each formed from an elastic, flexible material.

4. The gasket of claim 3, wherein the elastic, flexible material comprises at least one of rubber, silicone, polysiloxane, thermoplastic olefin, thermoplastic polyolefin, or thermoplastic elastomer.

5. The gasket of claim 1, wherein a thickness of the first spacer is different than a thickness of the second spacer.

6. The gasket of claim 1, wherein the first pin cutout and the second pin cutout each comprises a circular aperture.

7. The gasket of claim 6, wherein a first distance between the first pin groove is less than a diameter of the first pin cutout and a second distance between the second pin groove is less than a diameter of the second pin cutout.

8. The gasket of claim 1, further comprising:

a connecting ring; and a streamer connected to the connector by the connecting ring.

9. The gasket of claim 8, wherein the connector comprises a grommet configured to receive the connecting ring and the streamer comprises a streamer grommet configured to receive the connecting ring.

10. The gasket of claim 1, wherein the first spacer and the second spacer each have a thickness between about ⅛" to about ½".

11. The gasket of claim 1, wherein the gasket is movable between a first position and a second position, wherein the gasket is in the second position when positioned between the mount link of the turbine mount assembly and the turbine frame mount of the turbine.

12. The gasket of claim 11, wherein the gasket is flat when in the first position and bent at the connector when in the second position.

13. A system comprising:

a first spacer comprising:

a first pin cutout comprising a first circular aperture, and a first pin groove connected to the first pin cutout, the first spacer having a circular shape with a flat portion adjacent to opposite sides of the first pin groove, the first pin groove having a first distance that is less than a first diameter of the first pin cutout; and a second spacer comprising:

a second pin cutout comprising a second circular aperture, and a second pin groove connected to the second pin cutout, the second spacer having a circular shape with a flat portion adjacent to opposite sides of the second pin groove, the second pin groove having a second distance that is less than a second diameter of the second pin cutout, wherein the first spacer is positioned between a first side of a mount link of a turbine mount assembly and a turbine frame mount of a turbine and the second space is positioned between a second side of the mount link and the turbine frame mount.

14. The system of claim 13, further comprising:

a first connecting ring;

a first streamer connected to the first spacer by the first connecting ring;

a second connecting ring; and a second streamer connected to the second spacer by the second connecting ring.

15. The system of claim 14, wherein the first spacer comprises a first grommet configured to receive the first connecting ring and the first streamer comprises a first streamer grommet configured to receive the first connecting ring, and wherein the second spacer comprises a second grommet configured to receive the second connecting ring and the second streamer comprises a second streamer grommet configured to receive the second connecting ring.

16. A method for installing a gasket onto a turbine comprising:

removing a turbine from an aircraft via a turbine mount assembly, the turbine having a turbine frame mount extending from a turbine frame and the turbine mount assembly having a mount link coupled to the turbine frame mount via a turbine frame pawl pin;

installing a first spacer onto the turbine frame pawl pin and between the mount link and a first flange of the turbine frame mount, wherein the first spacer includes a first pin cutout to receive the turbine frame pawl pin and a first pin groove that is configured to expand to enable the turbine frame pawl pin to pass through the first pin groove and into the first pin cutout; and installing a second spacer onto the turbine frame pawl pin and between the mount link and a second flange of the turbine frame mount, wherein the second spacer includes a second pin cutout to receive the turbine frame pawl pin and a second pin groove that is configured to expand to enable the turbine frame pawl pin to pass through the second pin groove and into the second pin cutout.

17. The method of claim 16, wherein the first spacer and the second spacer are connected via a connector.

18. The method of claim 16, wherein each of the first spacer and the second spacer have a circular shape with a flat portion adjacent to opposite sides of the first pin groove and the second pin groove, respectively.

19. The method of claim 16, wherein the first spacer and the second spacer are each formed from an elastic, flexible material.

20. The method of claim 19, wherein the elastic, flexible material comprises at least one of rubber, silicone, polysiloxane, thermoplastic olefin, thermoplastic polyolefin, or thermoplastic elastomer.

* * * * *